United States Patent
Kuwabara et al.

(10) Patent No.: US 6,954,421 B2
(45) Date of Patent: Oct. 11, 2005

(54) ORTHOGONAL FREQUENCY DIVISION MULTIPLEXING RECEIVER DEVICE

(75) Inventors: Masahiro Kuwabara, Yokosuka (JP); Manabu Sawada, Yokohama (JP)

(73) Assignee: Denso Corporation, Kariya (JP)

( * ) Notice: Subject to any disclaimer, the term of this patent is extended or adjusted under 35 U.S.C. 154(b) by 884 days.

(21) Appl. No.: 09/785,939

(22) Filed: Feb. 15, 2001

(65) Prior Publication Data

US 2001/0015954 A1 Aug. 23, 2001

(30) Foreign Application Priority Data

Feb. 18, 2000 (JP) ........................................ 2000-046799

(51) Int. Cl.[7] .............................................. H04J 11/00
(52) U.S. Cl. ...................... 370/203; 370/208; 370/343; 375/346
(58) Field of Search ................................ 370/208, 210, 370/343, 203, 202, 277, 330, 314, 430, 480, 485, 491, 497, 500, 516, 529; 375/316, 320, 329, 346, 348

(56) References Cited

U.S. PATENT DOCUMENTS 5,912,876 A * 6/1999 H'mimy .................... 370/210
6,088,398 A * 7/2000 Wahlqvist et al. .......... 375/260
6,768,713 B1 * 7/2004 Siala et al. .................. 370/203

FOREIGN PATENT DOCUMENTS

JP 11-163822 6/1999

* cited by examiner

Primary Examiner—Ajit Patel
(74) Attorney, Agent, or Firm—Harness, Dickey & Pierce, PLC

(57) ABSTRACT

After the OFDM signal for MMAC is received by a receiving unit, an FFT processing unit converts such OFDM signal into the signal Y(l, k) in the frequency axis direction. A data extracting unit extracts a data signal Y(l, kd) and a pilot extracting unit extracts a pilot signal Y(l, kp). A complex dividing unit divides the extracted pilot signal with a pilot signal X(l, kp) having the identical amplitude and phase as that in the transmitting side. An interpolating unit performs a linear interpolation by using a transmission path response H(l, kp) of the pilot signal in order to calculate the transmission path estimation value H'(l, k) of the data signal. A complex dividing unit divides the extracted data signal with the transmission path estimation value of the data signal in order to calculate the data signal Y'(l, kd) that is compensated in the amplitude and phase.

5 Claims, 15 Drawing Sheets

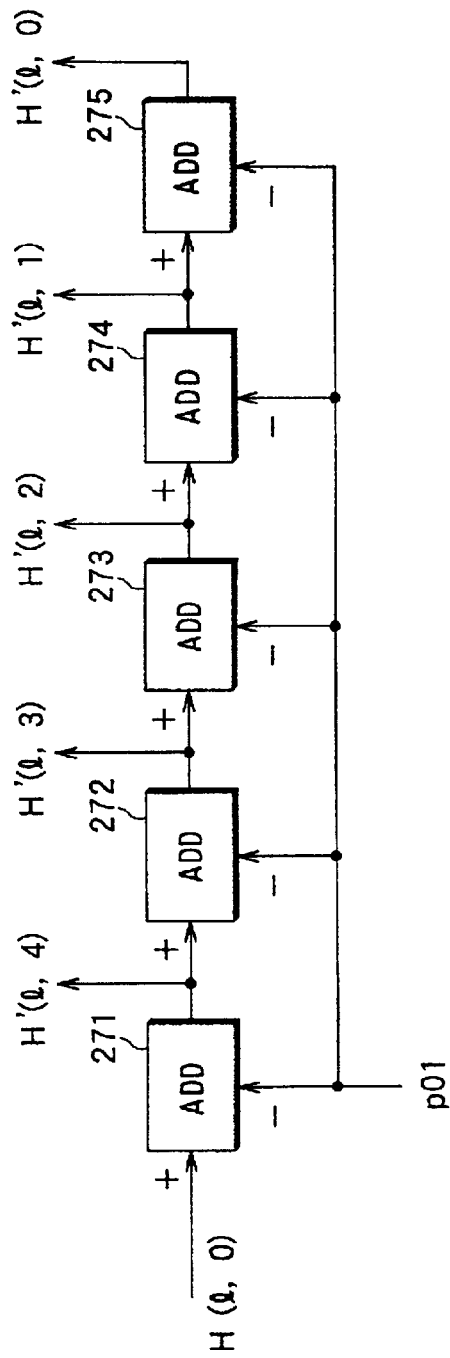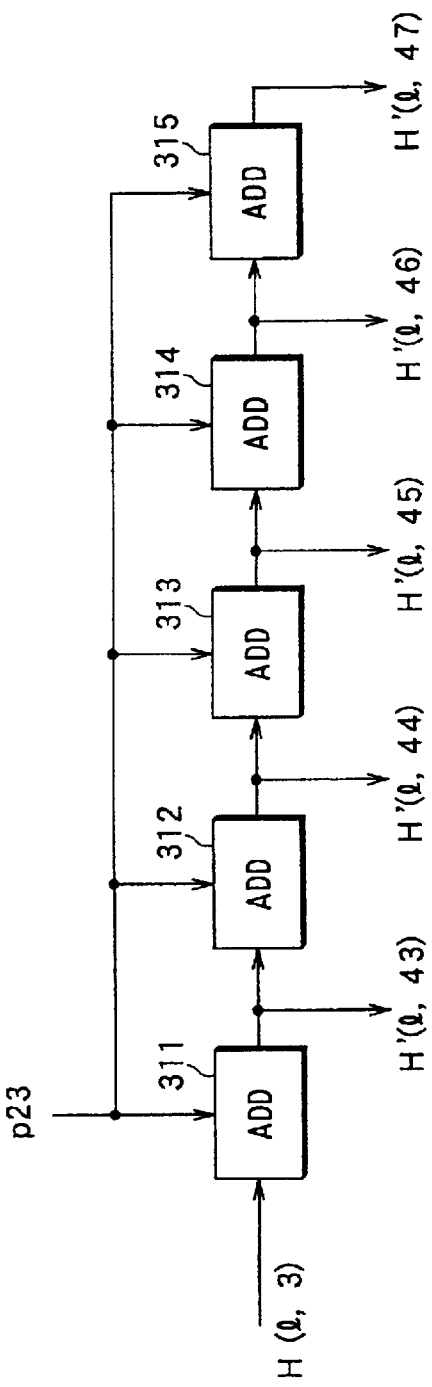

ORTHOGONAL FREQUENCY DIVISION MULTIPLEXING RECEIVER DEVICE

CROSS REFERENCE TO RELATED APPLICATION

This application is based on and incorporates herein by reference Japanese Patent Application No. 2000-46799 filed Feb. 18, 2000.

BACKGROUND OF THE INVENTION

The present invention relates to an orthogonal frequency division multiplexing (OFDM) receiver device in communication systems utilizing an orthogonal frequency division multiplexing system.

Recent communication systems are required to transmit large capacity data such as video information or the like as the digital value not only with wire transmission system but also with radio transmission system. In this case, it is essential to introduce not only the Phase Shift Keying system to modulate the phase with the information by utilizing difference of phase such as BPSK and QPSK or the like but also the Quadrature Amplitude Modulation system to modulate the phase and amplitude with the information by utilizing differences of phase and amplitude such as 16 QAM and 64 QAM or the like. The signal modulated with the QAM method such as 16 QAM and 64 QAM is transmitted from a transmitter. The transmitted signals is then received by a receiver device through the transmission path, and demodulated to the original data through the synchronous detection.

In this case, when the wired transmission path is used, any problem does not occur. However, when the radio or wireless transmission link is established, a large distortion is generated in both amplitude and phase of the received signal due to poor transmission path caused by, for example, fading. Therefore, as a method of alleviating distortion with the transmission path, it is proposed to hold the same known pilot signal (known signal) in both transmitter and receiver device. Such a pilot signal is transmitted from the transmitter and the transmission path response is determined by using the pilot signal received with the receiver device and the pilot signal held in the receiver device. Then the transmission path is estimated by interpolating the transmission path response in order to compensate for both amplitude and phase of the received data signal (information signal).

For example, JP-A-11-163822 teaches a system that is utilized to the communication system signal using the OFDM system to compensate for distortion in both amplitude and phase of the data signal included in the received OFDM signal.

The above prior art discloses an OFDM receiver device which is used in the digital broadcasting system using the ground wave. Therefore, it is a precondition that the format of OFDM signal in the European DVB-T system or the like as illustrated in FIG. 18 is used. In FIG. 18, the vertical direction indicates the time (symbol), while the horizontal direction indicates frequency (carrier). Moreover, white circles in the same figure define data symbols (data signals), while the black circles define the pilot symbols (pilot signals). The pilot symbol is transmitted in every 12 carrier frequencies and is cyclically allocated so that the same sub-carrier frequency is attained after the four symbols. The OFDM receiver device disclosed in the above prior art compensates for distortion of the amplitude and phase of the received data signal and performs equalization on the frequency axis for the OFDM signal of the format illustrated in FIG. 18.

As the format of OFDM signal, there is proposed the OFDM signal format for MMAC (Multimedia Mobile Access Communication) in addition to the format for the above ground digital broadcast. In this OFDM signal format, as illustrated in FIG. 19, the data signals (white circles in the figure) of 0 to 4, 5 to 17, 18 to 29, 30 to 42, 43 to 47 are allocated in the frequency direction. The pilot signals (black circles in the figure) are also dispersed among such data signals. Moreover, these allocations are identical in the time direction.

In the case of this OFDM signal format, the data signals of 0 to 4 are allocated in the side of frequency lower than the pilot signal in the lowest frequency side among the four pilot signals. The data signals of 43 to 47 are allocated in the side of frequency higher than the pilot signal in the highest frequency side among four pilot signals. Since the OFDM signal format of FIG. 18 is different from that of FIG. 19 as explained above, it is impossible to adequately compensate for both amplitude and phase of the received data signal for the OFDM signal format for MMAC as illustrated in FIG. 19 in the OFDM receiver device disclosed in the above prior art (JP-A-11-163822).

SUMMARY OF THE INVENTION

It is an object of the present invention to provide an OFDM receiver device that can properly compensate for both amplitude and phase of the received data for a OFDM signal format for MMAC.

In an OFDM receiver device according to the present invention, when an OFDM receiver device receives an OFDM signal, a plurality of information signals and a plurality of known signals are extracted from the OFDM signal. The information signals and the known signals are in an arrangement on a frequency axis in such a manner that the known signals are dispersed in the information signals. The information signals are allocated in a frequency band lower than the known signals in the lowest frequency side among the known signals and in a frequency band higher than the known signals in the highest frequency side among the known signals. The arrangement of the OFDM signals are in the same time direction. A transmission path response of the known signals are calculated by using the extracted known signals. Transmission path characteristics of the information signals allocated among the known signals, the information signals allocated in the lower frequency side and the information signals allocated in the higher frequency side are calculate by using the calculated transmission path response of the known signals. The amplitude and phase of the extracted information signals by are compensated for by the estimated transmission characteristics of the information signals.

Preferably, the transmission path characteristics is estimated by a linear interpolation or an interpolation using Sinc functions.

BRIEF DESCRIPTION OF THE DRAWINGS

The above and other objects, features and advantages of the present invention will become more apparent from the following detailed description made with reference to the accompanying drawings.

FIG. 4 is a block diagram illustrating a first transmission path estimation unit used in the interpolation unit of FIG. 3;

FIG. 8 is a block diagram illustrating a fifth transmission path estimation unit used in the interpolation unit of FIG. 3;

FIG. 18 is a diagram illustrating an allocation example of the OFDM signal format in the European DVB-T system or the like.

DETAILED DESCRIPTION OF THE PREFERRED EMBODIMENT

Figure 1:
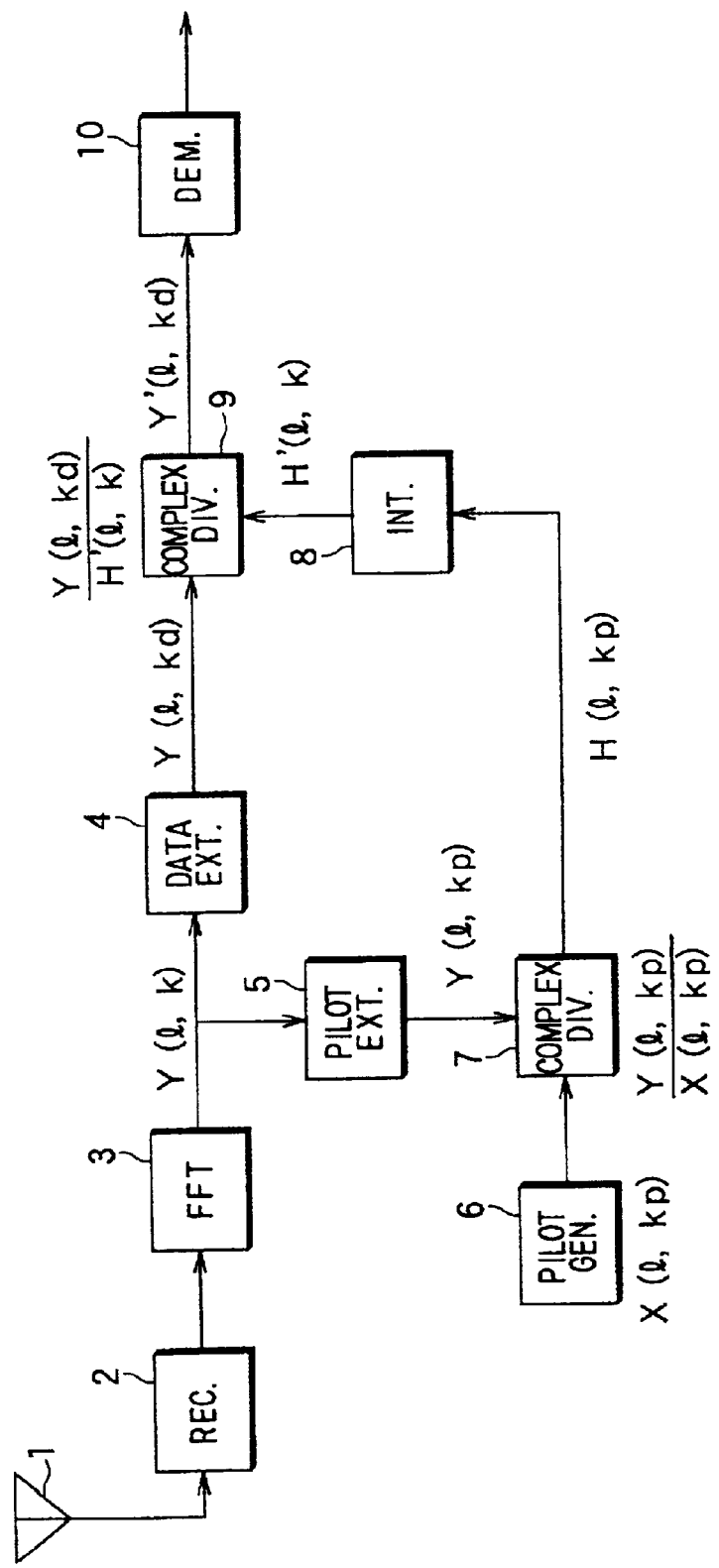
FIG. 1 is a block diagram illustrating an OFDM receiver device according to an embodiment of the present invention.
Figure 19:
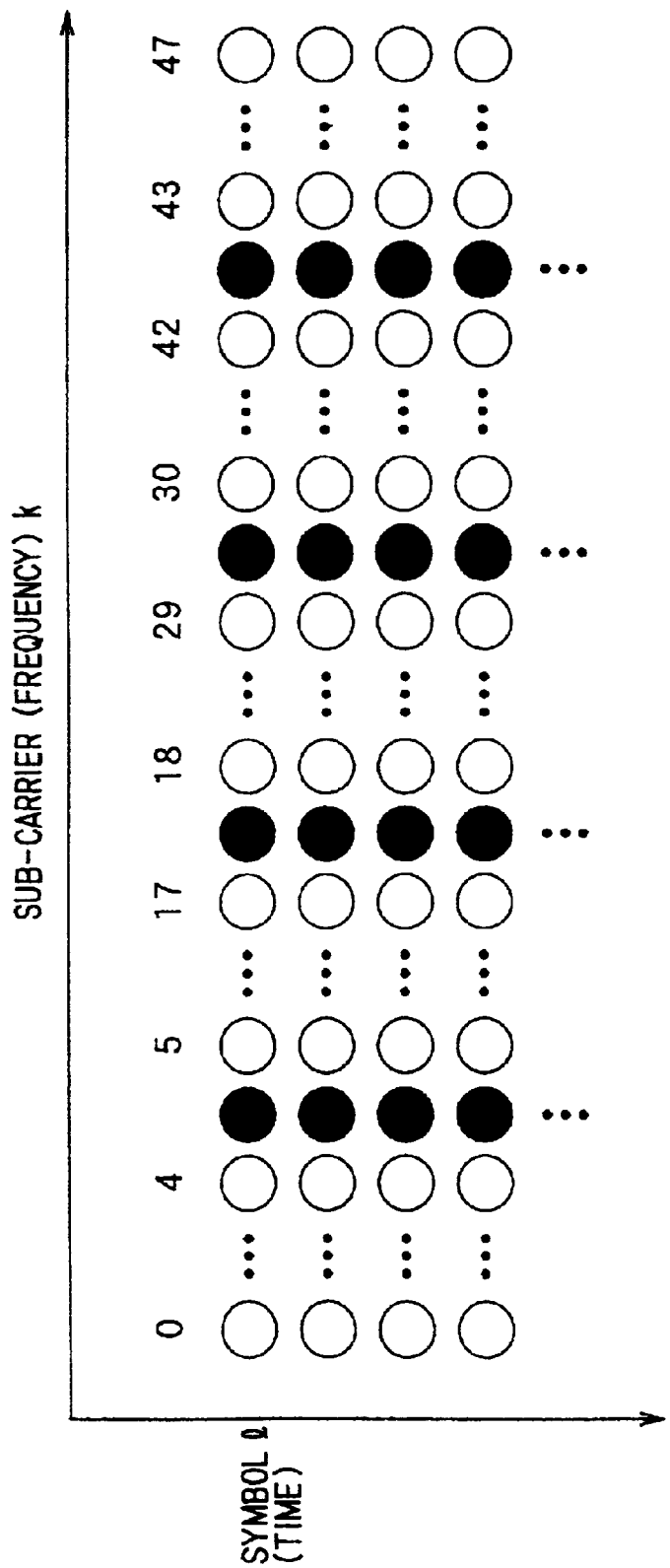
FIG. 19 is a diagram illustrating an allocation example of the OFDM signal format for MMAC.

FIG. 1 illustrates a structure of the OFDM receiver device used in the communication system utilizing the OFDM signal format for MMAC of FIG. 19. This OFDM receiver device is constructed with an antenna 1, a receiving unit 2, FFT (Fast Fourier Transform) processing unit 3, a data extracting unit 4, a pilot extracting unit 5, a pilot generating unit 6, a complex dividing unit 7, an interpolating unit 8, a complex dividing unit 9 and a demodulating unit 10.

The OFDM signal transmitted in the signal format of the OFDM signal of FIG. 19 is received with the antenna 1. The receiving unit 2 converts the OFDN signal received with the antenna 1 to the baseband OFDM signal through the RF signal receiving process and timing regenerating process or the like. The FFT processing unit 3 converts the baseband OFDM signal processed in the receiving unit 2 to the Y(l, k) [where, k=0 to 51] signal in the frequency axis direction. Here, "l" indicates a symbol and "k" indicates the signal number arranged in the frequency axis direction.

The data extracting unit 4 extracts only the data signal Y(l, kd) [where, kd=0 to 47] in the OFDM signal format of FIG. 19 from the signal in the frequency axis direction processed in the FFT processing unit 3. Moreover, the pilot extracting unit 5 extracts only the pilot signal Y(l, kp) [where, kp=0 to 3] in the OFDM signal format of FIG. 19 from the signal in the frequency axis direction processed in the FFT processing unit 3.

Meanwhile, the pilot generating unit 6 generates a pilot signal X(l, kp) [where, kp=0 to 3] having the same amplitude and phase as that in the transmitting side. The complex dividing unit 7 executes the complex division for the pilot signal from the pilot extracting unit 5 with the pilot signal from the pilot generating unit 6 to calculate the transmission path response (i, kp) [where, kp=0 to 3] of the pilot signal.

The interpolating unit 8 calculates the transmission path estimation value H'(l, k) [where, k=0 to 47] estimating the transmission path of the data signal through the interpolation using the transmission path response of the pilot signal. In practice, the interpolating unit 8 calculates the transmission path estimation value H'(l, k) [where, k=0 to 47] estimating the transmission path characteristic of the data signals of 0 to 4, 5 to 17, 18 to 29, 30 to 42, 43 to 47 through the interpolation using the four pilot signals of FIG. 19. In this case, as the interpolation, for example, the linear interpolation or interpolation with the Sinc function may be used.

The complex dividing unit 9 executes the complex division for the data signal from the data extracting unit 4 with the transmission path estimation value estimating the transmission path of the data signal from the interpolating unit 8 to calculate the data signal Y'(l, kd) [where, kd=0 to 47] compensated in the amplitude and phase.

The demodulating unit 10 executes the demodulation of data signal using the data signal outputted from the complex dividing unit 9 and then outputs a digital data stream.

Next, as the interpolation in the interpolating unit 8, the linear interpolation and the interpolation with the Sinc function will be explained, respectively.

(Linear Interpolation)

Figure 2:
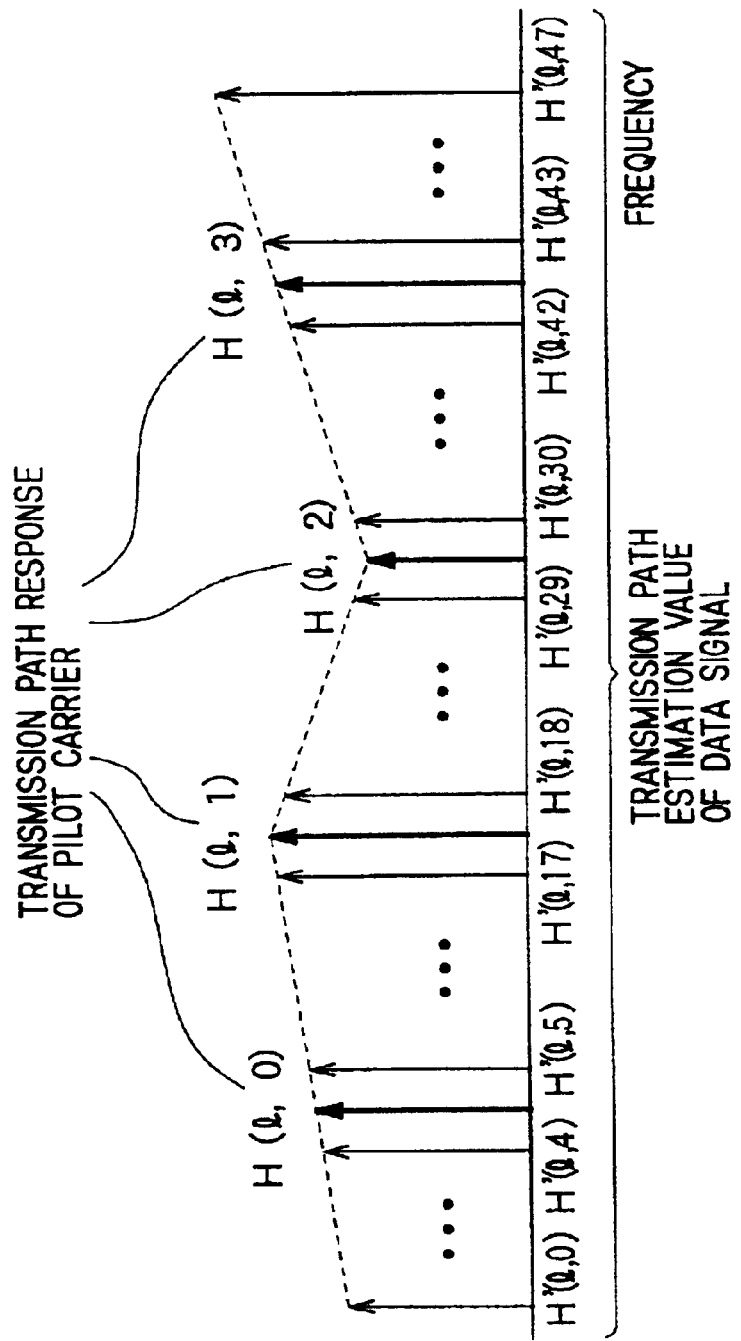
FIG. 2 is a diagram illustrating a linear interpolation method used in the embodiment.

In this embodiment, in the interpolating unit 8, as illustrated in FIG. 2, the transmission path estimation value H'(l, k) [where, k=0 to 47] estimating the transmission path of the data signal is calculated by the linear interpolation using the transmission path response H(l, kp) [where, kp=0 to 3] of the pilot signal.

Figure 3:
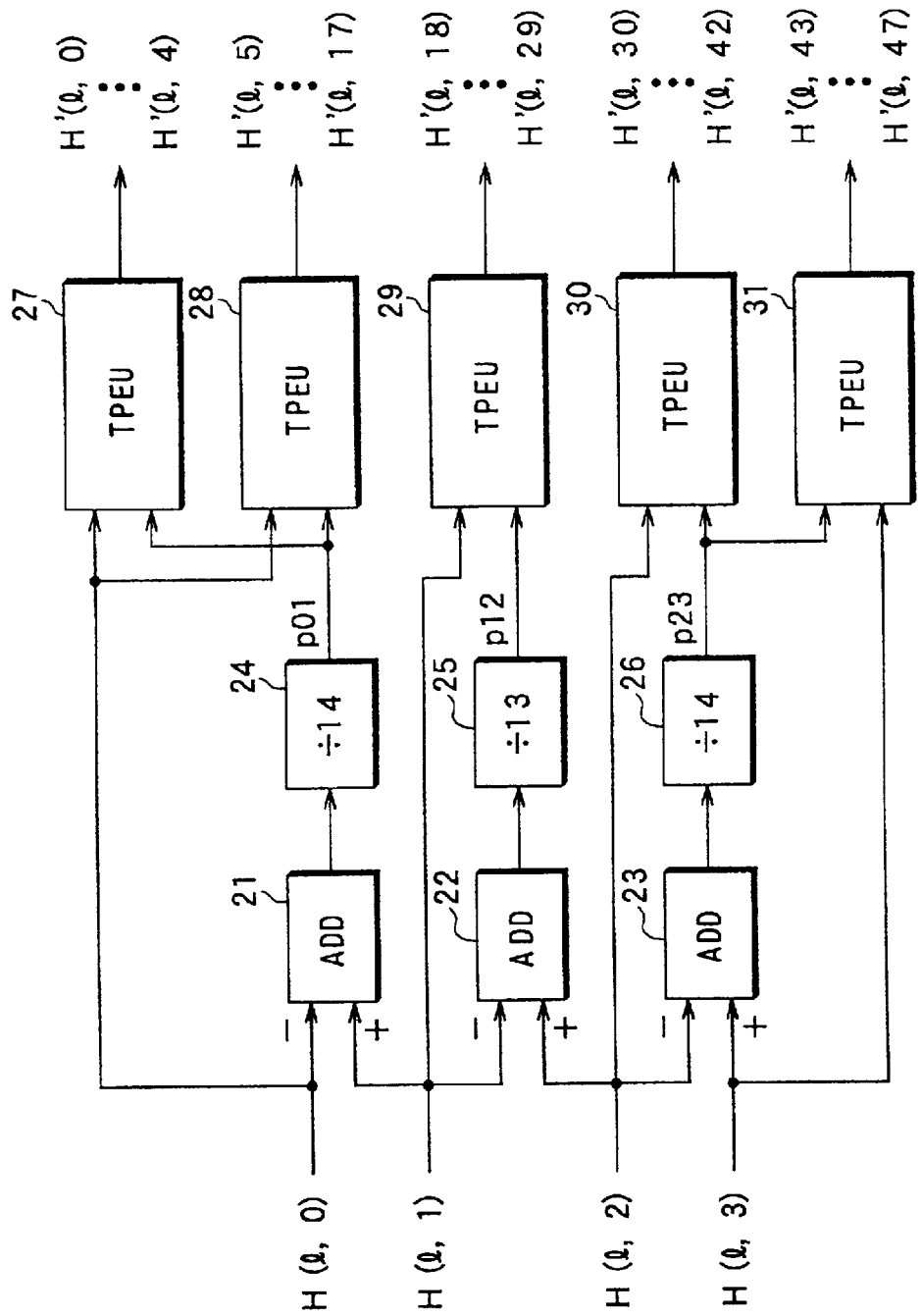
FIG. 3 is a block diagram illustrating an interpolation unit used in the embodiment.

FIG. 3 illustrates a practical structure of the interpolating unit 8 for linear interpolation.

This linear interpolating unit 8 is constructed with adding units 21 to 23, dividing units 24 to 26 and first to fifth transmission path estimating units (TPEUs) 27 to 31. The transmission path response H(l, kp) [where, kp=0 to 3] of pilot signal calculated in the complex dividing unit 7 is inputted to the adding unit 21, adding unit 22 and adding unit 23. The adding units 21, 22, 23 respectively calculate difference of the transmission path response of the adjacent pilot signals. An output of the adding unit 21 is then inputted to the dividing unit 24 and is then divided by a constant 14 because an interval of the pilot signals in both sides of the data signals 5 to 17 is 14. The result of division p01 indicates a gradient between the pilot signals. In the same manner, an output of the adding means 22 is inputted to the dividing unit 25 and is then divided by a constant 13. Moreover, an output of the adding unit 23 is inputted to the dividing unit 26 is then divided by 14. Results of division p12, p23 are outputted respectively from the dividing units 25 and 26.

The first transmission path estimating unit 27 calculates the transmission path estimation values H'(l, 0) to H'(l, 4) of the data signal of FIG. 2 using the value p01 outputted from the dividing unit 24 and the transmission path response H(l, 0) of the pilot signal. The second transmission path estimating unit 28 calculates the transmission path estimation values H'(l, 5) to H'(l, 17) of the data signal of FIG. 2 using the value p01 outputted from the dividing unit 24 and the transmission path response (i, 0) of the pilot signal. The third transmission path estimating unit 29 calculates the transmission path estimation values H'(l, 18) to H'(l, 29) of the data signal of FIG. 2 using the value p12 outputted from the dividing unit 25 and the transmission path response H(l, 1) of the pilot signal. The fourth transmission path estimating unit 30 calculates the transmission path estimation values H'(l, 30) to H'(l, 42) of the data signal of FIG. 2 using the value p23 outputted from the dividing unit 26 and the transmission path response H(l, 2) of the pilot signal. The fifth transmission path estimating unit 31 calculates the transmission path estimation values H'(l, 43) to H'(l, 47) of the data signal of FIG. 2 using the value p23 outputted from the dividing unit 26 and the transmission path response H(l, 3) of the pilot signal.

FIG. 4 illustrates a practical structure of the transmission path estimating unit 27. In this transmission path estimating unit 27, the value p01 outputted from the dividing unit 24 is sequentially subtracted from the transmission path response H(l, 0) of the pilot signal to calculate the transmission path estimation values H'(l, 4) to H'(l, 0) of the data signal.

In practice, an adding unit 271 calculates the transmission path estimation value H'(l, 4) from a difference between the transmission path response H(l, 0) of the pilot signal and the value p01. Moreover, an adding unit 272 calculates the transmission path estimation value H'(l, 3) from a difference between the transmission path estimation value H'(l, 4) calculated in the adding unit 271 and the value p01. Moreover, an adding unit 273 calculates the transmission path estimation value H'(l, 2) from a difference between the transmission path estimation value H'(l, 3) calculated in the adding unit 272 and the value p01. Moreover, an adding unit 274 calculates the transmission path estimation value H'(l, 1) from a difference between the transmission path estimation value H'(l, 2) calculated in the adding unit 273 and the value p01. Moreover, an adding unit 275 calculates the transmission path estimation value H'(l, 0) from a difference between the transmission path estimation value H'(l, 1) calculated in the adding unit 274 and the value p01.

Figure 5:
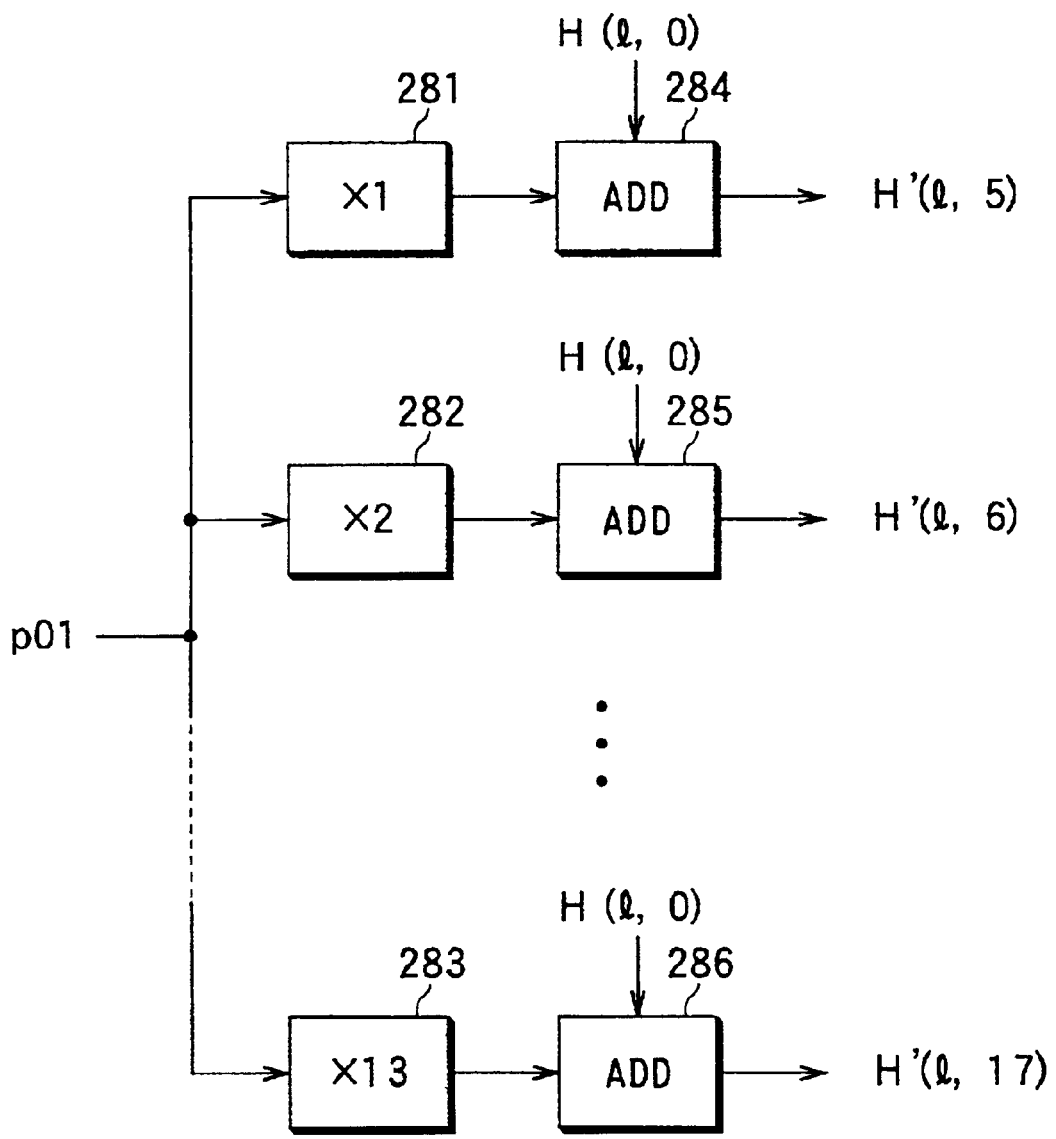
FIG. 5 is a block diagram illustrating a second transmission path estimation unit used in the interpolation unit of FIG. 3.

FIG. 5 illustrates a practical structure of the transmission path estimating unit 28. In this transmission path estimating unit 28, the value p01 outputted from the dividing unit 24 is sequentially added to the transmission path response H(l, 0) of the pilot signal to calculate the transmission path estimation values H'(l, 5) to H'(l, 17) of the data signal.

In practice, the value p01 is multiplied by a constant 1 of multiplying unit 281 and subsequently the value obtained is then added to the transmission path response H(l, 0) of the pilot signal in an adding unit 284. Moreover, the value p01 is multiplied by a constant 2 of a multiplying unit 282 and subsequently the value obtained is then added to the transmission path response H(l, 0) of the pilot signal in an adding unit 285 to calculate the transmission path estimation value H'(l, 6). Thereafter, similar multiplication and adding processes are performed to calculate the transmission path estimation value H'(l, 17) from a multiplying unit 283 and an adding unit 286 in the final stage.

Figure 6:
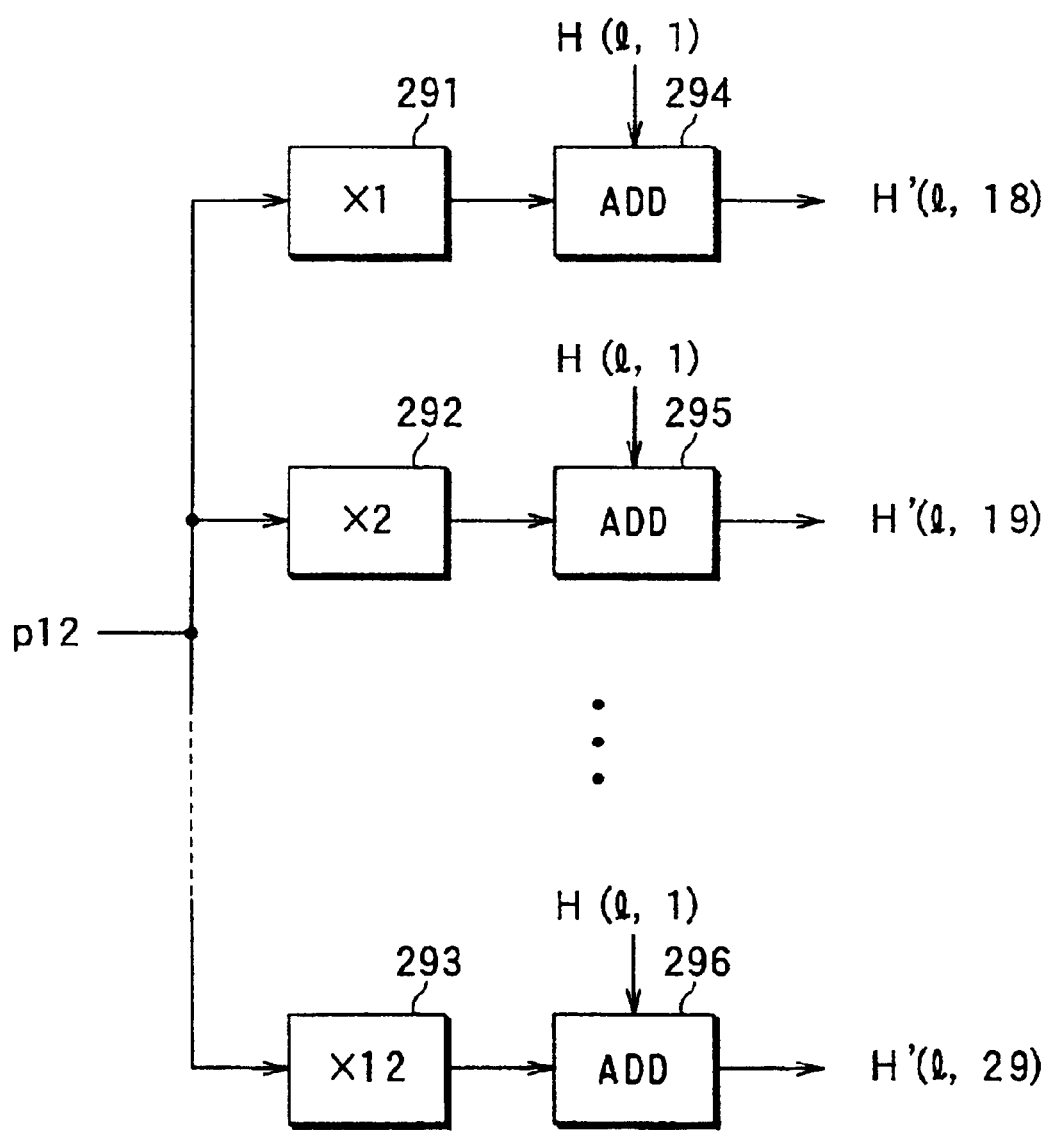
FIG. 6 is a block diagram illustrating a third transmission path estimation unit used in the interpolation unit of FIG. 3.

FIG. 6 illustrates a practical structure of the transmission path estimating unit 29. The structure of this transmission path estimating unit 29 is similar to that of FIG. 5. It comprises multiplying units 291, 292, 293 and adding units 294, 295, 256 to calculate the transmission path estimation values H'(l, 18) to H'(l, 29) of the data signal by sequentially adding the value p12 outputted from the dividing unit 25 to the transmission path response H(l, 1) of the pilot signal.

Figure 7:
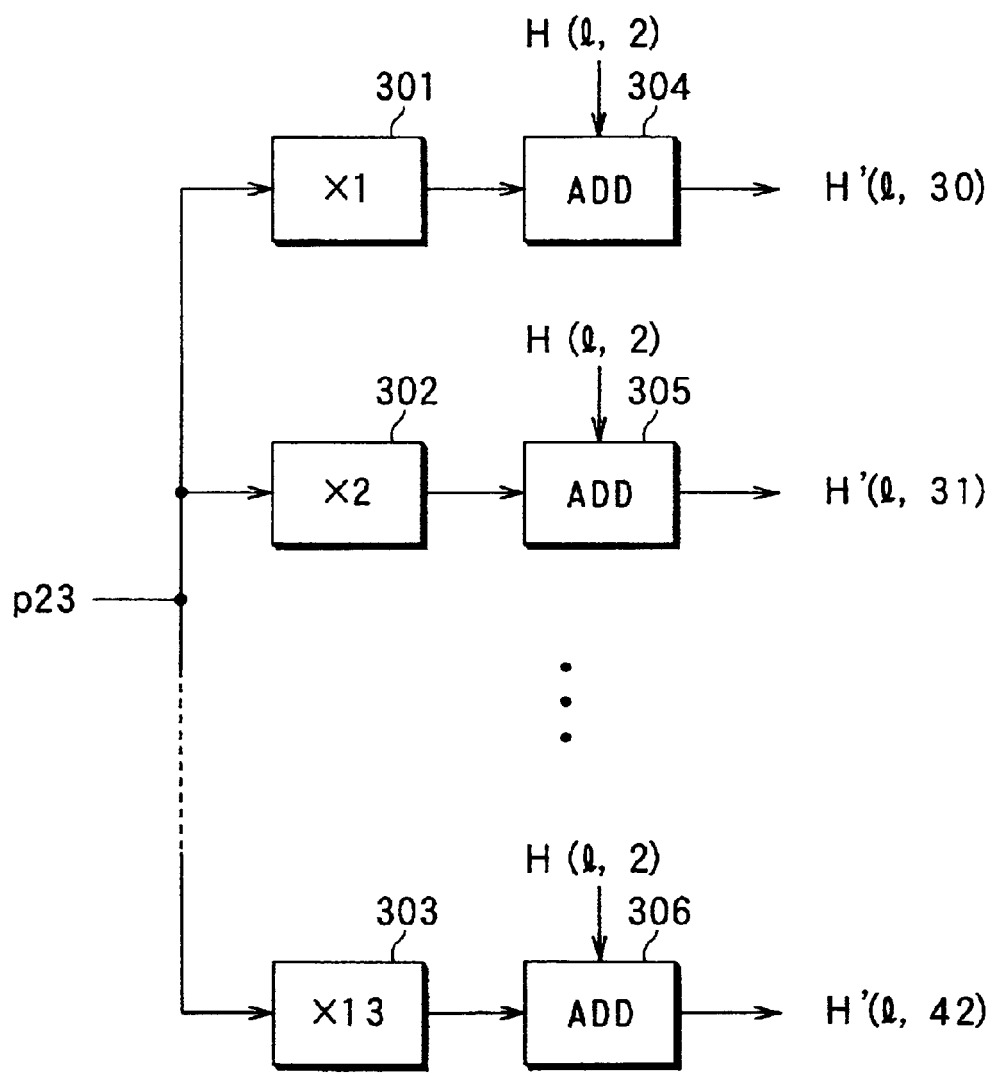
FIG. 7 is a block diagram illustrating a fourth transmission path estimation unit used in the interpolation unit of FIG. 3.

FIG. 7 illustrates a practical structure of the transmission path estimating unit 30. The structure of this transmission path estimating unit 30 is similar to that of FIG. 5. It comprises multiplying units 301, 302, 303 and adding units 304, 305, 306 to calculate the transmission path estimation values H'(l, 30) to H'(l, 42) of the data signal by sequentially adding the value p23 outputted from the dividing unit 26 to the transmission path response H(l, 2) of the pilot signal.

FIG. 8 illustrates a practical structure of the transmission path estimating unit 31. The structure of this transmission path estimating unit 31 is similar to that of FIG. 4. It comprises adding units 311, 312, 313, 314, 315 to calculate the transmission path estimation values H'(l, 43) to H'(l, 47) of the data signal by sequentially adding the value p23 outputted from the dividing unit 26 from the transmission path response H(l, 3) of the pilot signal.

As described above, the transmission path estimation values H'(l, 5) to H'(l, 17), H'(l, 18) to H'(l, 29), H'(l, 30) to H'(l, 42) located at the positions sandwiched respectively with the four pilot signals are calculated through the linear interpolation using the transmission path response of the four pilot signals. Moreover, the transmission path estimation values H'(l, 0) to H'(l, 4) are calculated, for the data signals in the lower frequency side not sandwiched with the pilot signals, with the linear interpolation using the transmission responses of the adjacent two pilot signals in the frequency side higher than such lower frequency. Thus, the transmission path estimation values H'(l, 43) to H'(l, 47) can be calculated, for the data signal in the higher frequency side not sandwiched with the pilot signals, by the linear interpolation using the transmission path response of the adjacent two pilot signals in the frequency side lower than such frequency. Accordingly, even in the communication system using the OFDM signal format for MMAC of FIG. 19, the transmission path estimation values H'(l, k) [where, k=0 to 47] estimating the transmission path characteristic of each data signal can be attained.

Figure 9:
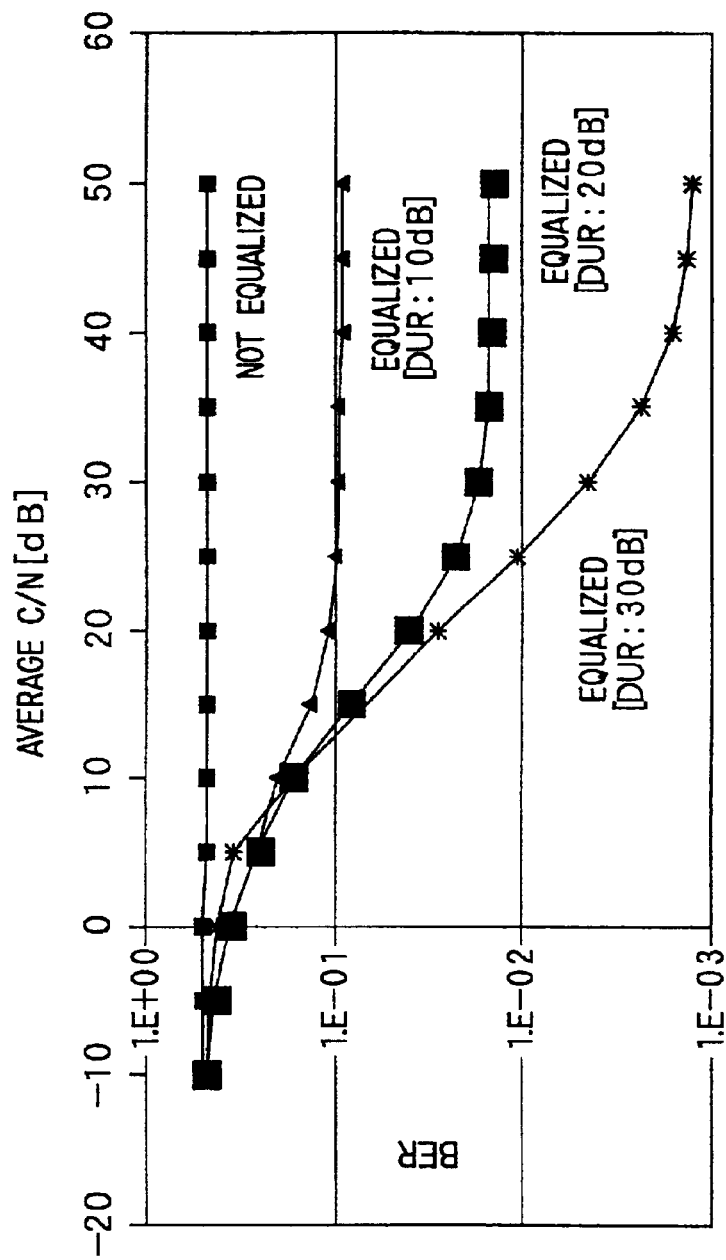
FIG. 9 is a diagram illustrating the result of simulation of bit error rate (EBR) for the average C/N of the OFDM receiver device in the embodiment when a linear interpolation is executed.

FIG. 9 illustrates a bit error rate (BER) obtained through a computer simulation in the case where the two waves Reyleigh fading environment is assumed for the transmission path in regard to the above OFDM receiver device.

Moreover, as main parameters for simulation, the maximum Doppler frequency is set to 52 Hz, the number of sub-carriers of OFDM signal is set to 52 (48 data carrier+4 pilot carriers), the effective symbol length is set to 3.2 $\mu$s, the guard interval length is set to 800 ns and the modulation system is set to 16 QAM.

From this FIG. 9, it can be understood, when the data signal is equalized, the higher the average C/N (power ratio of carrier and noise) becomes, the lower the bit error rate. Moreover, the larger DUR (desired-to-undesired ratio) which means a power ratio between the direct wave and the delayed wave is, the lower the bit error rate becomes.

(Interpolation by Sinc Function)

Figure 10:
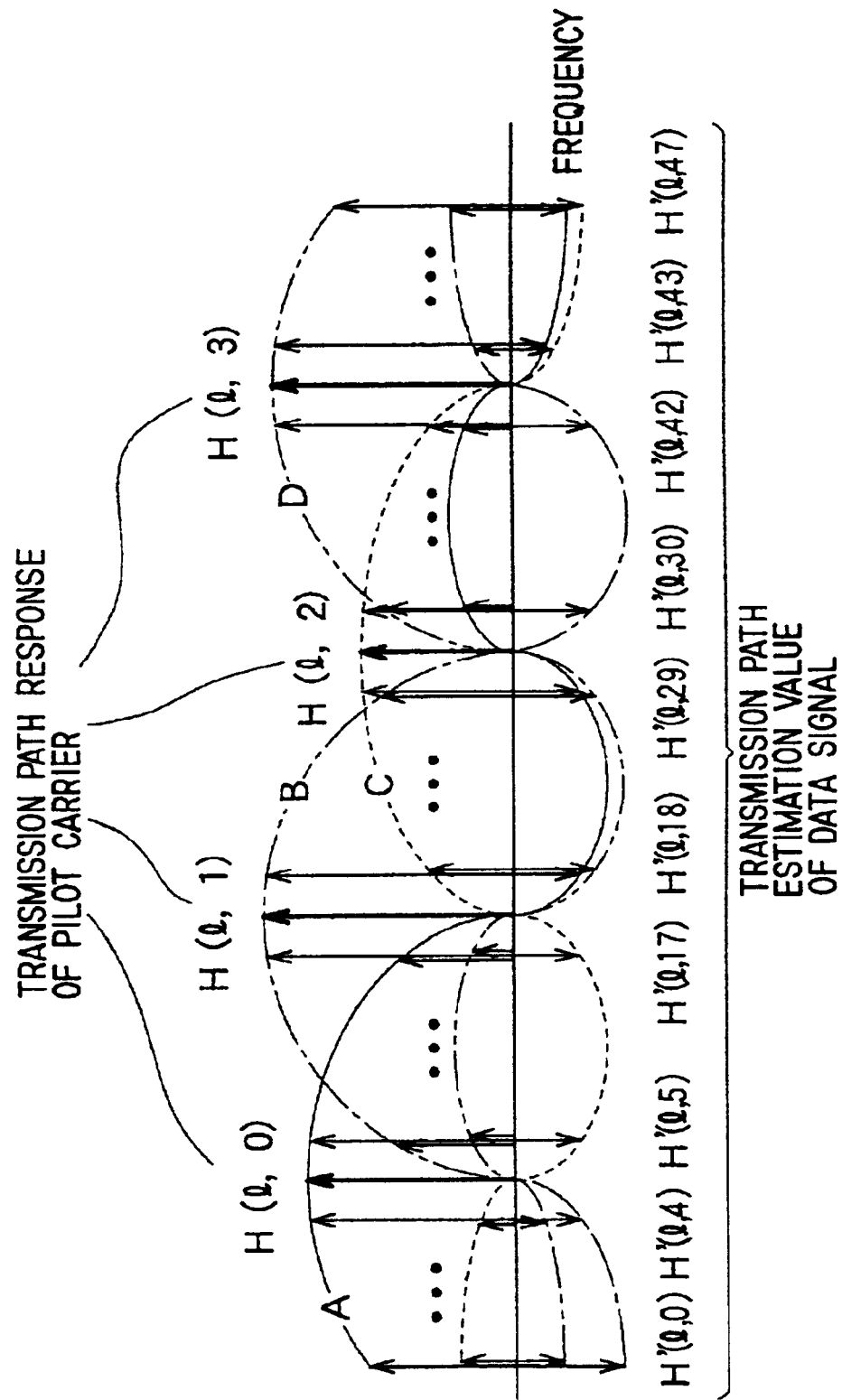
FIG. 10 is a diagram illustrating an interpolation by using the Sinc function.

In this case, as illustrated in FIG. 10, the transmission path estimation values H'(l, k) [where, k=0 to 47] estimating the transmission path of data signal is calculated in the interpolating unit 8 through the interpolation with the Sinc function using the transmission path response H(l, kp) [where, kp=0 to 3].

Here, the Sinc function is expressed as sin(x)/x. Moreover, the curve A in FIG. 10 passes the point where the maximum value matches with the transmission path response H(l, 0) and the transmission path response H(l, 1), transmission response H(l, 2), transmission response (l, 3) are almost zero. The curve B passes the point where the maximum value matches with the transmission response H(l, 1) and the transmission path response H(l, 0), transmission path response H(l, 2) and transmission path response (i, 3) are almost zero. The curve C passes the point where the maximum value matches with the transmission path response H(l, 2), the transmission path response H(l, 0), transmission path response H(l, 1) and transmission path response H(l, 3) are almost zero. The curve D passes the point where the maximum value matches with the transmission path response H(l, 3) and the transmission path response H(l, 0), transmission path response H(l, 1) and transmission path response H(l, 2) are almost zero.

Figure 11:
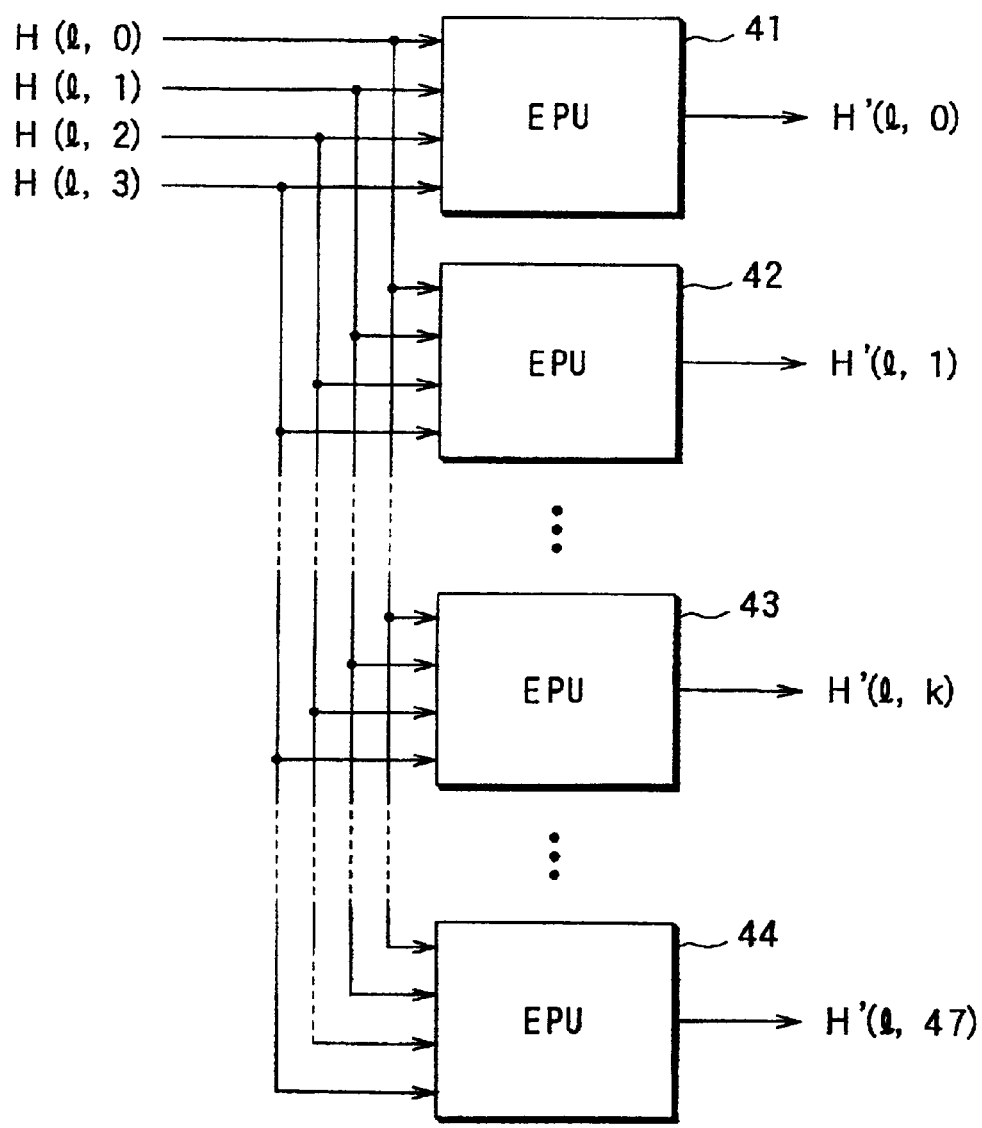
FIG. 11 is a block diagram illustrating an interpolation unit for the interpolation with the Sinc function.

FIG. 11 illustrates a practical structure of the interpolating unit 8 for executing interpolation with the Sinc function.

The interpolating unit 8 using the Sinc function is constructed with four estimation processing units (EPUs) 41, 42, 43, 44. These estimation processing units 41, 42, 43, 44 execute the interpolation by the Sinc function using the transmission path responses H(l, kp) [where, kp=0 to 3] of the pilot signal and respectively outputs the transmission path estimation values H'(l, k) [where, k=0 to 47] estimating the transmission path of data signal.

Figure 12:
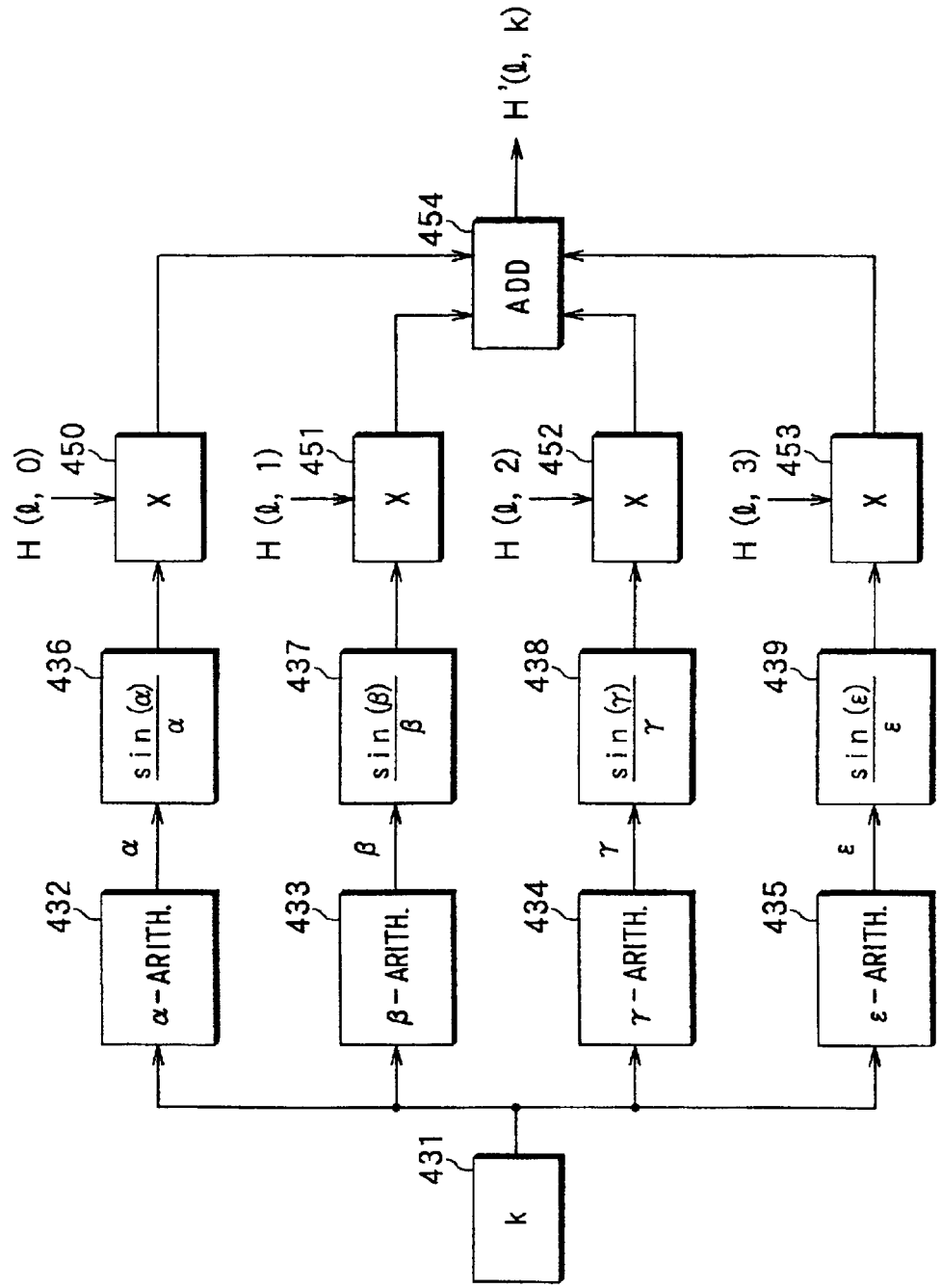
FIG. 12 is a block diagram illustrating a k-th estimation process unit used in the interpolation unit of FIG. 11.

The estimation processing units 41, 42, 43, 44 are formed in the identical structure and the structure and operations thereof will be explained with reference to the k-th estimation processing unit 43. FIG. 12 illustrates the practical structure of the k-th estimation processing unit 43.

In FIG. 12, the constant value k of the transmission path estimation value H'(l, k) of the data signal is inputted to a coefficient α-arithmetic circuit 432, a coefficient β-arithmetic circuit 433, a coefficient γ-arithmetic circuit 434 and a coefficient ε-coefficient arithmetic circuit 435.

Figure 13:
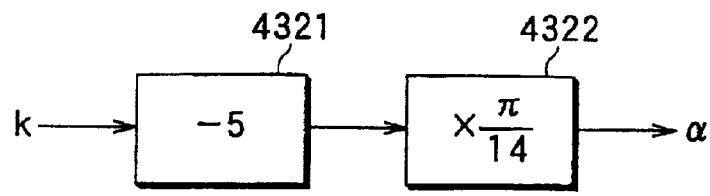
FIG. 13 is a block diagram illustrating an α-arithmetic circuit used in the k-th estimation process unit of FIG. 12.

In the coefficient α-arithmetic circuit 432, as illustrated in FIG. 13, the constant value 5 of a block 4321 is subtracted from a constant value k. The result of this subtraction is multiplied by a value (π/14) of the multiplying unit 4322. The result of this multiplication is defined as α. This value α is then inputted to a Sinc function unit 436 illustrated in FIG. 12 and a value of the Sinc function for the value α can be obtained in this Sinc function unit 436. Thereby, a value of the Sinc function for the k-th data signal can be obtained on the curve A of FIG. 10. Here, a value of Sinc function is multiplied by the transmission path response H(l, 0) of the pilot signal in the multiplying unit 450. The result of multiplication becomes a relation value for the transmission path estimation value H'(l, k) of the k-th data signal depending on the transmission response H(l, 0) of the pilot signal.

Figure 14:
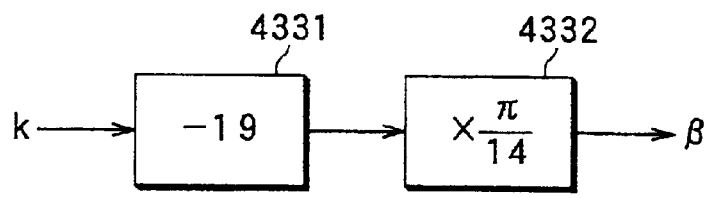
FIG. 14 is a block diagram illustrating a β-arithmetic circuit used in the k-th estimation process unit of FIG. 12.

Moreover, in the coefficient β-arithmetic circuit 433, as illustrated in FIG. 14, the constant value 19 of a block 4331 is subtracted from a constant value k. The result of this subtraction is multiplied by the value (π/14) of a multiplying unit 4332. The result of this multiplication is defined as β. This value β is inputted to a Sinc function unit 437 of FIG. 12. A value of Sinc function for the value β is obtained in the Sinc function unit 437. Thereby, a value of the Sinc function for the k-th data signal can be obtained on the curve B of FIG. 10. A value of the Sinc function is multiplied by the transmission path response H(l, 1) of the pilot signal in a multiplying unit 451. The result of this multiplication becomes a relation value for the transmission path estimation value H'(l, k) of the k-th data signal depending on the transmission path response H(l, 1) of the pilot signal.

Figure 15:
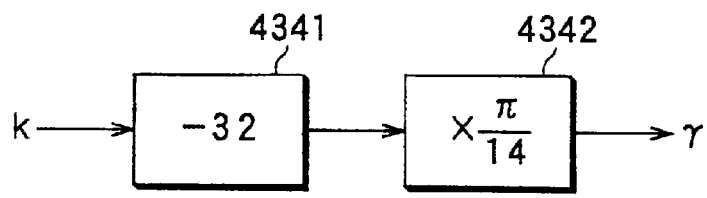
FIG. 15 is a block diagram illustrating a γ-arithmetic circuit used in the k-th estimation process unit of FIG. 12.

Moreover, in the coefficient γ-arithmetic circuit 434, as illustrated in FIG. 15, the constant value 32 of a block 4341 is subtracted from a constant value k. The result of this subtraction is multiplied by the value (π/14) of a multiplying unit 4342. The result of this multiplication is defined as γ. This value γ is inputted to a Sinc function unit 438 of FIG. 12 and a value of the Sinc function for the value γ can be obtained in the function unit 438. Thereby, a value of the Sinc function for the k-th data signal can be obtained on the curve C of FIG. 10. A value of the Sinc function is multiplied by the transmission path response H(l, 2) of the pilot signal in a multiplying unit 452. The result of this multiplication becomes a relation value for the transmission path estimation value H'(l, k) of the k-th data signal depending on the transmission path response H(l, 2) of the pilot signal.

Figure 16:
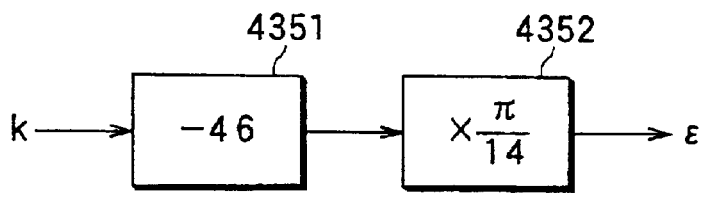
FIG. 16 is a block diagram illustrating an ε-arithmetic circuit used in the k-th estimation process unit of FIG. 12.

Moreover, in the coefficient ε-arithmetic circuit 435, as illustrated in FIG. 16, the value 46 of a block 4351 is subtracted from a constant value k. The result of this subtraction is multiplied by the value (π/14) of a multiplying unit 4352. The result of this multiplication is defined as ε. This value ε is then inputted to a Sinc function unit 439 of FIG. 12 to obtain a value of the Sinc function for the value ε in the Sinc function unit 439. Thereby, a value of the Sinc function for the k-th data signal can be obtained on the curve D of FIG. 10. The value of the Sinc function is multiplied by the transmission path response H(l, 3) of the pilot signal in a multiplying unit 453. The result of this multiplication becomes a relation value for the transmission path estimation value H'(l, k) of the k-th data signal depending on the transmission path response H(l, 3) of the pilot signal.

Thereafter, the transmission path estimation value H'(l, k) of the k-th data signal can be obtained by adding the results of multiplication of the multiplying units 450 to 453 in an adding unit 454.

As described above, the transmission path estimation value H'(l, k) [where, k=0 to 47] estimating the transmission path of the data signal can be calculated by executing interpolating with the Sinc function using the transmission path response H(l, kp) [where, kp=0 to 3] of the pilot signal.

Figure 17:
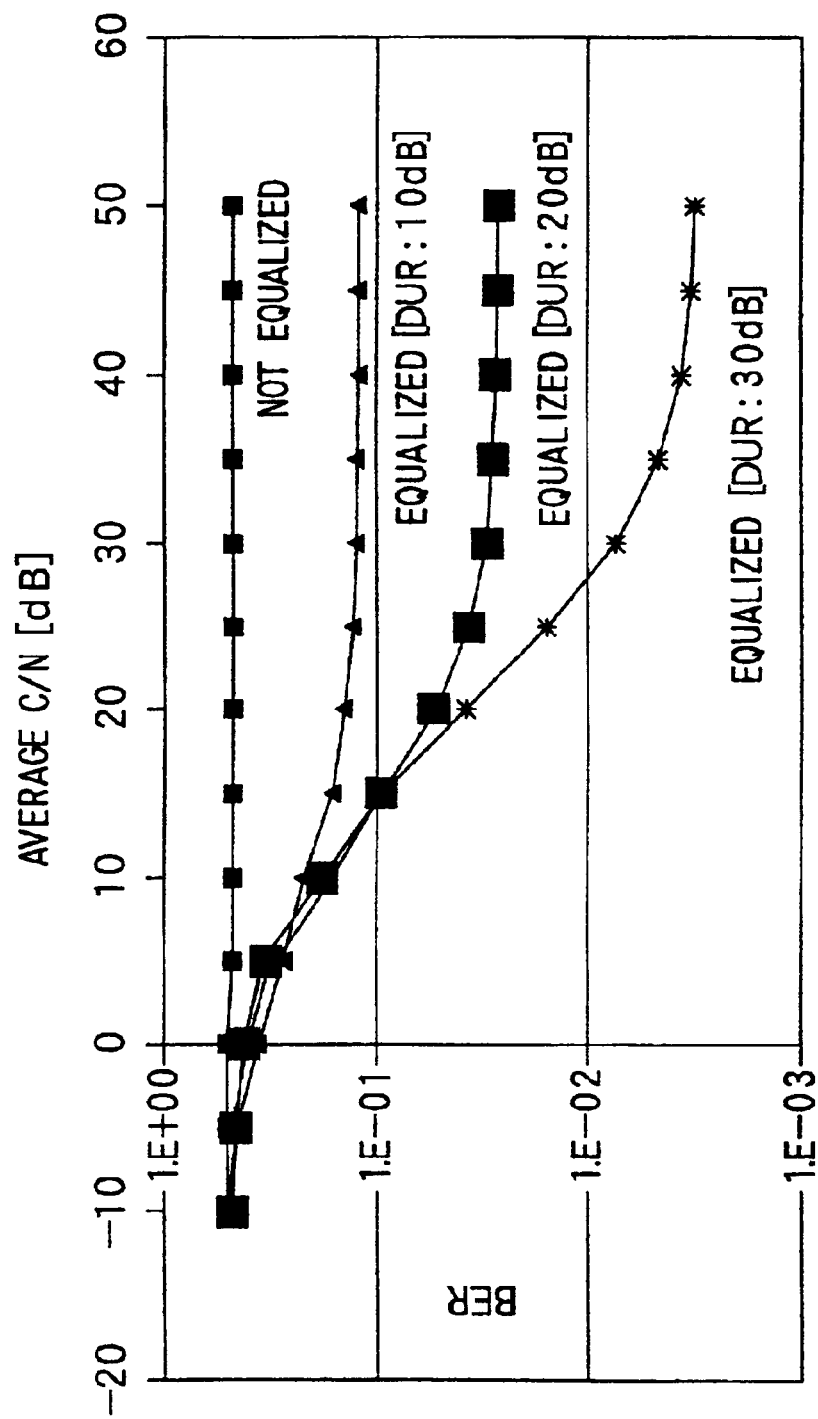
FIG. 17 is a diagram illustrating the result of simulation of bit error rate (EBR) for the average C/N of the OFDM receiver device in the embodiment when the linear interpolation is executed by using the Sinc function.
Figure 18:
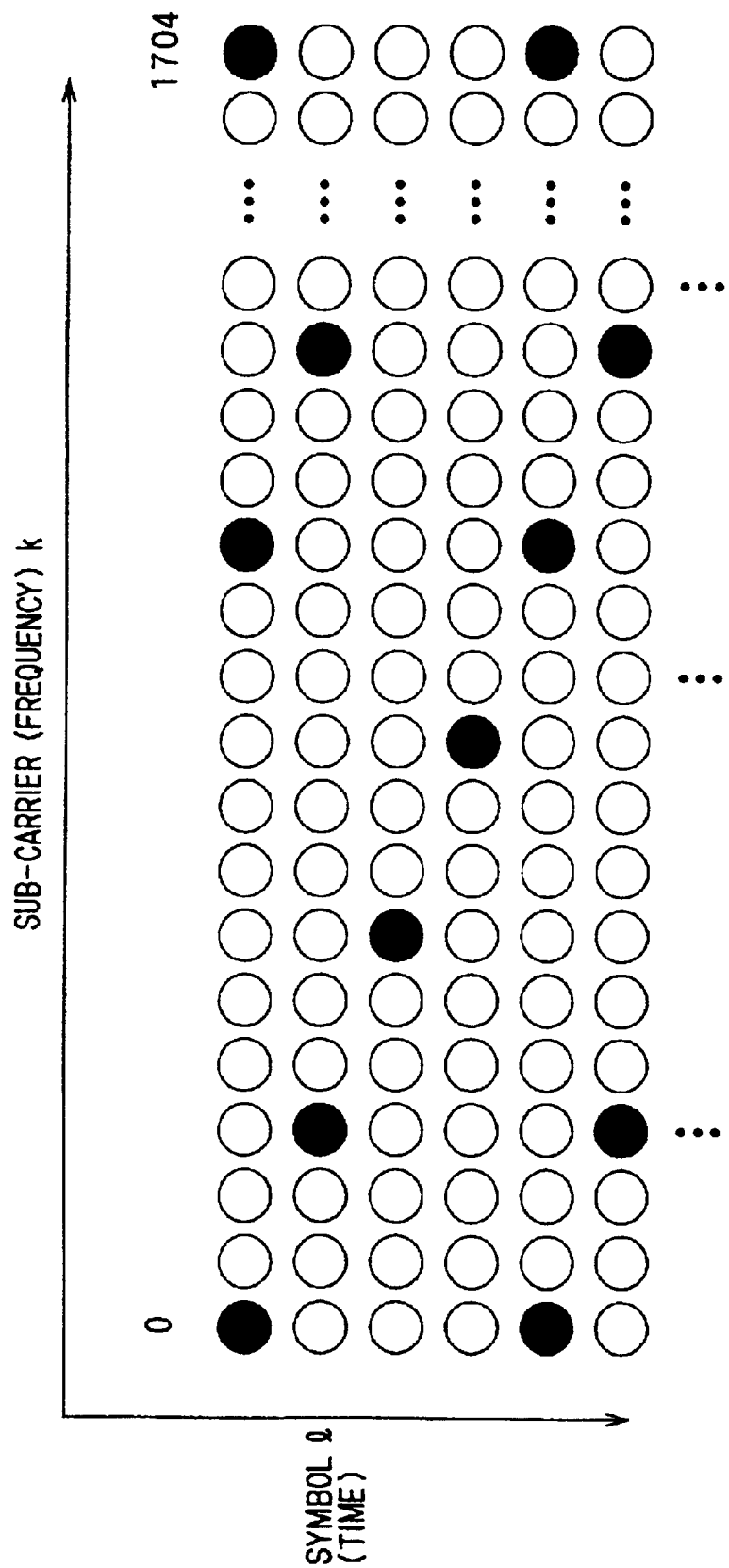

FIG. 17 illustrates a bit error rate (BER) through the computer simulation in the case where the transmission path is assumed under the 2-wave Rayleigh fading environment for the OFDM receiver device.

Moreover, as the main parameters for simulation, the maximum Doppler frequency is set to 52 Hz, the number of sub-carriers of OFDM signal is set to 52 (48 data carriers+4 pilot carriers), effective symbol length is set to 3.2 μs, the guard interval length is set to 800 ns and the modulation system is set to 16 QAM.

From FIG. 17, it can be understood that when the data signal is equalized as above, the higher the average C/N (power ratio of carrier and noise) is, the lower the bit error rate becomes. Moreover, the larger the DUR (ratio of direct wave and delay wave) is, the lower the bit error rate becomes.

The present invention is not limited to the disclosed embodiment, but may be implemented in many other ways without departing from the spirit of the invention.

What is claimed is:

1. An OFDM receiver device comprising:
   means for receiving an OFDM signal and extracting a plurality of information signals and a plurality of known signals from the OFDM signal, wherein the information signals and the known signals are in an arrangement on a frequency axis in such a manner that the known signals are dispersed in the information signals, the information signals are allocated in a frequency band lower than the known signals in the lowest frequency side among the known signals and in a frequency band higher than the known signals in the highest frequency side among the known signals, and the arrangement of the OFDM signals are in a same time direction;

means for calculating a transmission path response of the known signals using the extracted known signals;

means for estimating transmission path characteristics, by using the calculated transmission path response of the known signals, of the information signals allocated among the known signals, the information signals allocated in the lower frequency side and the information signals allocated in the higher frequency side; and means for compensating for amplitude and phase of the extracted information signals by using the estimated transmission characteristics of the information signals, wherein;

the estimating means estimates the transmission path characteristics by a linear interpolation.

2. The OFDM receiver device as in claim 1, wherein:

the estimating means estimates the transmission path characteristics of the information signals allocated in the lower frequency side by using the transmission path response of the known signals in the lowest frequency side and the transmission path response of the known signals allocated adjacent to the higher frequency side than the known signals of the lowest frequency side, and estimates the transmission path characteristics of the information signals allocated in the higher frequency side by using the transmission path response of the known signals in the highest frequency side and the transmission path response of the known signals allocated adjacent to the lower frequency side than the known signals of the higher frequency side.

3. An OFDM receiver device comprising:

means for receiving an OFDM signal and extracting a plurality of information signals and a plurality of known signals from the OFDM signal, wherein the information signals and the known signals are in an arrangement on a frequency axis in such a manner that the known signals are dispersed in the information signals, the information signals are allocated in a frequency band lower than the known signals in the lowest frequency side among the known signals and in a frequency band higher than the known signals in the highest frequency side among the known signals, and the arrangement of the OFDM signals are in a same time direction;

means for calculating a transmission path response of the known signals using the extracted known signals;

means for estimating transmission path characteristics, by using the calculated transmission path response of the known signals, of the information signals allocated among the known signals, the information signals allocated in the lower frequency side and the information signals allocated in the higher frequency side; and means for compensating for amplitude and phase of the extracted information signals by using the estimated transmission characteristics of the information signals, wherein;

the estimating means estimates the transmission path characteristics by an interpolation using Sinc functions.

4. The OFDM receiver device as in claim 3, wherein:

the estimating means determines the transmission path response of each of the extracted known signals and executes the interpolation by matching the transmission responses of the known signals with a maximum value of the Sinc functions and combining the Sinc functions while passing the Sinc functions through a zero point of the transmission path response of the other known signals.

5. An OFDM receiver device comprising:

means for receiving an OFDM signal and extracting a plurality of information signals and a plurality of known signals from the OFDM signal, wherein the information signals and the known signals are in an arrangement on a frequency axis in such a manner that the known signals are dispersed in the information signals, the information signals are allocated in a frequency band lower than the known signals in the lowest frequency side among the known signals and in a frequency band higher than the known signals in the highest frequency side among the known signals, and the arrangement of the OFDM signals are in a same time direction;

means for calculating a transmission path response of the known signals using the extracted known signals;

means for estimating transmission path characteristics, by using the calculated transmission path response of the known signals, of the information signals allocated among the known signals, the information signals allocated in the lower frequency side and the information signals allocated in the higher frequency side; and means for compensating for amplitude and phase of the extracted information signals by using the estimated transmission characteristics of the information signals, wherein the estimating means estimates the transmission path characteristics by an interpolation using a Sinc function which passes non-peak points of the Sinc function.

* * * * *